(12) United States Patent
Rapp et al.

(10) Patent No.: US 6,180,143 B1
(45) Date of Patent: Jan. 30, 2001

(54) CHEWING GUM CONTAINING 1,1-GPS SWEETENER AND PROCESS OF PREPARING

(75) Inventors: Knut M. Rapp, Offstein; Ingrid Willibald-Ettle, Landau, both of (DE)

(73) Assignee: Sudzucker Akiengesellschaft Mannheim Ochsenfurt (DE)

( * ) Notice: Under 35 U.S.C. 154(b), the term of this patent shall be extended for 0 days.

(21) Appl. No.: 09/147,987

(22) PCT Filed: Aug. 9, 1997

(86) PCT No.: PCT/EP97/04345

§ 371 Date: May 26, 1999

§ 102(e) Date: May 26, 1999

(87) PCT Pub. No.: WO98/12933

PCT Pub. Date: Apr. 2, 1998

(30) Foreign Application Priority Data

Sep. 25, 1996 (DE) .............................. 196 39 342

(51) Int. Cl.[7] .................. A23G 3/30; A61K 9/68
(52) U.S. Cl. .................. 426/3; 424/48; 424/440; 426/5

(58) Field of Search .................. 426/3, 5, 660; 424/48, 440

(56) References Cited

U.S. PATENT DOCUMENTS 4,961,935 * 10/1990 Cherukuri et al. ................ 426/3
5,578,339 * 11/1996 Kunz et al. ................ 426/660 X

FOREIGN PATENT DOCUMENTS 3715919   12/1988  (DE) .
0328849    8/1989  (EP) .
0625578   11/1994  (EP) .

* cited by examiner

Primary Examiner—Arthur L. Corbin
(74) Attorney, Agent, or Firm—Ostrolenk, Faber, Gerb & Soffen, LLP

(57) ABSTRACT

The invention relates to chewing gum containing 1.1-GPS (1-O-α-D-glucopyranosyl-D-sorbitol), especially a sweetening agent mixture of 6-O-α- D-glucopyranosyl-D-sorbitol (1.6-GPS), 1-O-α-D-glucopyranosyl-D-sorbitol (1.1-GPS) and 1-O-α-D-glucopranosyl-D-mannitol (1.1-GPM).

18 Claims, 1 Drawing Sheet

CHEWING GUM CONTAINING 1,1-GPS SWEETENER AND PROCESS OF PREPARING

BACKGROUND OF THE INVENTION

The invention relates to a chewing gum containing 1-O-D-glucopyranosyl-D-sorbitol, particularly a mixture of sweeteners comprising 6-O-α-D-glucopyranosyl-D-sorbitol, 1-O-α-D- glucopyranosyl-D-sorbitol, and 1-O-α-D-glucopyranosyl-D-mannitol.

Chewing gums usually contain a water-insoluble chewing gum base and a water-soluble fraction which, inter alia, accounts for the flavour and the sweetness of the chewing gum The water-soluble fraction, particularly the sweetener used, are important for the properties of the chewing gum such as, for example, storability, release of flavours or active ingredients, appearance, surface structure or texture. The composition of the sweetener must be considered with a view to the possible development of caries. Sugar-containing chewing gums are favourable for the development of caries and, in addition, are unsuitable for diabetics. Therefore, sugar-free or low-sugar chewing gums containing sugar alcohols such as sorbitol mannitol or xylitol have been proposed. But the presence of these sugar alcohols causes absorption of water so that the properties of the chewing gum change in an undesired fashion. In order to overcome this problem, EP-B1 0 328 849 suggests the use of a mixture of sweeteners composed of almost equimolar fractions of 6-O-α-D-glucopyranosyl-D-sorbitol (abbreviated as 1,6-GPS in what follows) and 1-O-α-D-glucopyranosyl-D-mannitol (abbreviated as 1,1-GPM in what follows) in the chewing gums.

Chewing gums must satisfy greatly diverse requirements. These depend to a large extent upon the intended use of the chewing gum, e.g., as a fancy food or as a carrier of pharmaceutical active ingredients, and also upon the subjective flavour perception of the consumer. In view of the large number of different requirements, it is desirable to provide additional improved chewing gum compositions. Thus, a large number of the known state-of-the-art sugar-free chewing gums show recrystallisation of the sugar replacement substances employed as sweeteners and hence, an undesirable texture or surface. Furthermore, for example, chewing gums containing the equlimolar non-hygroscopic mixture of 1,6-GPS and 1,1-GPS have reduced water absorption but require comparatively higher amounts of plasticisers to ensure an acceptable structure of the chewing gum.

Therefore, the industrial problem underlying the present invention is to provide an improved sugar-free or low-sugar chewing gum which overcomes the above-indicated deficiencies.

DESCRIPTION OF THE INVENTION

The solution of this industrial problem resides on providing a chewing gum containing 1,1-GPS (1-O-α-D-glucopyranosyl-D-sorbitol) and, in particular, a chewing gum containing a sweetener mixture comprising 1,6-GPS, 1,1-GPM, and 1,1-GPS. 1,1-GPM can be present in anhydrous form and/or as dihydrate. Chewing gums which contain 1,1-GPS or one of the aforementioned sweetener mixtures as the sweetener unexpectedly have the advantage that the 1,1-GPS used according to the invention and, in particular, the sweetener mixture, have a masticating influence upon the structure of the chewing gum and, at the same time, prevent drying out of the chewing gum. The chewing gums according to the invention therefore have an improved, particularly a more flexible, structure and can be stored for long time periods by virtue of their non-existing or low hygroscopicity. Furthermore, the 1,1-GPS used according to the invention and the sweetener mixture are more readily soluble than, for example, an equimolar sweetener mixture comprising 1,6-GPS and 1,1-GPM so that an improved or modified release of flavour and/or active ingredients results. The 1,1-GPS used and the sweetener mixture are particularly readily soluble. The chewing gums made with 1,1-GPS or the sweetener mixture can continually release pharmaceutically active ingredients in a particularly advantageous fashion. Finally, the presence of 1,1-GPS reduces the tendency to recrystallisation of the 1,1-GPM so that the desired structure of the chewing gum remains preserved even during prolonged storage. The use of 1,1-GPS, particularly of a sweetener mixture comprising 1,6-GPS, 1,1-GPS, and 1,1-GPM, in a chewing gum therefore results in a surprising and advantageous improvement of the release of flavours and/or active ingredients and, in view of the reduced tendency to recrystallisation and the plasticising effect of 1,1-GPS and of the sweetener mixture, renders a chewing gum with improved organoleptic properties and increased storabilty.

In the context of the present invention, a chewing gum is understood as a foodstuff, fancy food or drug which comprises a basic chewing gum compound facilitating prolonged dwell time in the mouth and throat region and which contains active ingredients such as flavours, foodstuffs or dietary supplements and/or active medical ingredients.

The invention relates in particular to a sugar-free chewing gum of the aforementioned composition which is advantageously acariogenic and suitable for diabetics. The invention also relates to low-sugar chewing gums which contain 1,1-GPS or the aforementioned sweetener mixture and, in addition, an amount of sugar which is reduced vis-a-vis conventional sugar-cointaning chewing gums.

According to the invention, it is preferred to use 1,1-GPS or the cited sweetener mixture in the inventive chewing gums in liquid form, particularly as a syrup, or as a solid dry substance, preferably in an amount of 10 to 75% by weight, more preferably 30 to 60% by weight, based on the total weight of the chewing gum According to the invention, the chewing gum contains specifically a sweetener mixture composed of 10 to 50 % by weight of 1,6-GPS, 2 to 20% by weight of 1,1-GPS, and 30 to 70% by weight of 1,1-GPM, based on the weight ofthe sweetener mixture. In another embodiment of the invention, it is provided that the chewing gum contains a sweetener mixture composed of 5 to 10 % by weight of 1,6-GPS, 30 to 40% by weight of 1,1-GPS, and 45 to 60% by weight of 1,1-GPM, based on the weight of the sweetener mixture.

The basic chewing gum compound which can be used in the inventive chewing gums is present as 10 to 75% by weight, preferably 15 to 40% by weight, of the total weight of the chewing gum. The basic chewing gum compound usually comprises elastomers, elastomer solvents, plasticisers, fillers, thickeners and/or disintegrants and lubricants.

Butadiene-styrene copolymers, polyolefins, specifically polyethylene and polyisobutylene, irobutylene-isoprene copolymers, long-chain polyvinyl esters or polyvinyl ethers, polyvinylisobutyl ether, polyvinyl alcohol or the like can be used as synthetic elastomers. Gutta, such as chicle, percha, Malaya, Jelutong, Leche di Caspi, Niger, caoutchouc such as latex, sheets or the like can be used as natural elastomers.

As elastomer solvents there can be used: resins such as mastic, colophony, gum benzoin, resin Damar, glycerol- and pentaerythrite esters of the resin acids, coumarone-indene resins, and glycerol esters of rubber, resin or wood and similar substances.

Calcium carbonate, magnesium carbonate, aluminium, calcium and magnesium-silicate, titanium dioxide, cellulose, aluminium oxide or silicic acid and combinations thereof and similar substances are used as fillers.

Paraffin waxes and synthetic waxes, lecithin, glycerol monostearate, hydrogenated and partially hydrogenated vegetable oils, combinations thereof or the like are of interest as plasticisers.

Alginic acid, alginates, agar-agar, Guar flour, thickening cellulose derivatives, gum arabic, lecithins, monoglycerides, paraffin waxes, glycerol triacetate, glycerol monostearate, animal fats, glycerol monolaurate, coconut oils, mixtures thereof or the like can be used as thickeners.

In addition, and preferably in an amount of 0 to 3% by weight, based on the total weight of the chewing gum, the inventive chewing gums contain flavourings or aromatics, such as, for example, peppermint oils, essential oils of various flavour lines, fruit extracts, or synthetic aromatic substances, food-compatible acids such as citric acid, ascorbic acid, tartaric acid, malic acid, fumaric acid or combinations thereof In addition, it can be provided to addd buffer substances such sodium citrate or potassium phosphate, to the chewing gum.

In a particularly preferred embodiment, the inventive chewing gums contain pharmaceutically active ingredients. The high storage stability and the improved solubility features of the inventive chewing gum make them particularly suitable for transferring pharmaceutically active substances, i.e., substances serving for the prophylaxis or therapy of symptoms of sickness or deficiency, into the mouth and throat areas of the consumer and to release them there. According to the invention, substances such eucalyptol, menthol, ascorbic acid, vitamins, minerals, nicotine, coffein, enzymes, co-enzymes, antibiotics, dentin-hardening or protecting substances such as fluorides, active fungicidal and bactericidal ingredients, combinations thereof and the like are used. The aforementioned pharmaceutically active ingredients are to be used in a physiologically effective amount, i.e., in an amount causing the desired physiological effect in the body. According to the invention, by varying the mutual ratio of 1,6-GPS, 1,1-GPS, and 1,1-GPM, the solubility features of the water-soluble substances of the chewing gum can be modified and in this way, a release of active ingredients adapted to the various requirements and conditions governing the administration of the drug can be achieved. An increase in the 1,6-GPS content causes an increase in solubility. In this way, the release of the active ingredient can be accelerated. An increase in the 1,1-GPM content, however, reduces the solubility. In this way the release of the active ingredient can be delayed and can take place continually over an extended period of time. An increase in the 1,1-GPS content results in a further increase in solubility. In this way, a particularly fast release of the active ingredient can be obtained. In view of the 1,1-GPS content of the chewing gum, the tendency of the 1,1-GPM to recrystallisation is reduced so that stable embedding of the active ingredient in an unaltered physical and chemical environment is possible. The plasticising effect of the sweetener mixture in the chewing gum also facilitates a gentle processing at lower temperatures so that especially thermolabile active ingredients or aromatic substances can be incorporated into the chewing gums. Of course, the active ingredient's improved release and incorporation, which are made possible by the invention in the chewing gum, is not restricted to those substances but also holds for other substances, e.g., flavourings.

In an other embodiment of the invention, the inventive chewing gum contains additional sweeteners in amounts of 0 to 5% by weight, preferably 0.01 to 3% by weight, particularly preferably 0.01 to 1 % by weight, based on the total weight of the chewing gum. According to the invention, particularly intense sweeteners such as acesulfame-K, cyclamate, aspartame, glycyrrhizine, dihydrochalcone, for example Neohesperidin Dihydrochalcone, steviosides, saccharin, Alitame, sucralose, mixtures of the same or similar substances may be used.

In an other embodiment of the invention, it is provided to add sugar alcohols, preferably 0.5 to 65% by weight, based on the total weight of the chewing gum to the chewing gum. Sorbitol, mannitol, xylitol, maltitol, lactitol, erytlritol, hydrogenated starch hydrolysates (HSH), mixtures thereof or similar substances are sugar alcohols of interest. Since the cited sugar alcohols may imply an undesired absorption of water, they should be used preferably only in an amount such that the possible water absorption remains within acceptable values. This holds also for the glycerol which optionally can be used in amounts of 0 to 15% by weight, based on the total weight of the chewing gum. Accordingly, high glycerol or susgar-alcohol concentrations must be compensated by increased amounts of the advantageously nonhygroscopic sweetener mixture which is to be used in accordance with the invention.

Finally, it can be provided to add dyes, e.g., β-carotene or the like to the chewing gum The inventive chewing gums can be prepared in the form of pads, strips, filled and non-filled embeddings, and as pellets.

Another embodiment of the invention relates to the inventive chewing gums which, however, have a coated surface. The particularly advantageous composition of the chewing gums facilitates an improved structure and surface of the chewing gums so that these can be coated particularly easily and at low cost. The coating can be made with a sweetener mixture composed of 1,6-GPS, 1,1-GPS, and 1,1-GPM in greatly different compositions, an almost equimolar mixture of 1,6-GPS and 1,1-GPS, sorbitol, mannitol, xylitol, dextrose, sucrose, combinations thereof and the like. The chewing gums may be coated also with polymers, e.g., hydroxypropyl-, hydroxyethyl-, methyl- or ethyl-cellulose.

Finally, the invention provides that, in addition to 1,1-GPS or the sweetener mixture of 1,6-GPS, 1,1-GPS, and 1,1-GPM, in the inventive chewing gums there may be contained other sweeteners such as sucrose, hydrated oligosaccharides, dextrose, lactose, maltose, fructose or invert sugars, as well as other body-making fillers such as polydextrose or inulin.

The inventive chewing gums can be produced in the conventional manner by heating and kneading the basic chewing gum compound and, afterwards, adding the sweetener and other additives. The chewing gums according to the invention can be produced also by evaporating a solution containing the sweetener (e.g., 1,6-GPS, 1,1-GPS, and 1,1-GPM, or 1,1-GPS alone) together with a plasticiser (e.g., glycerol, propylene glycol) or drying together with an other sweetener (sugar, polyenes, intense sweetener) and by mixing the resulting syrup or the dried substances with the basic chewing gum compound and other additives.

BRIEF DESCRIPTION OF THE DRAWING

The following examples and the figure describe the invention in greater detail.

EXAMPLES

Example 1

Figure 1:
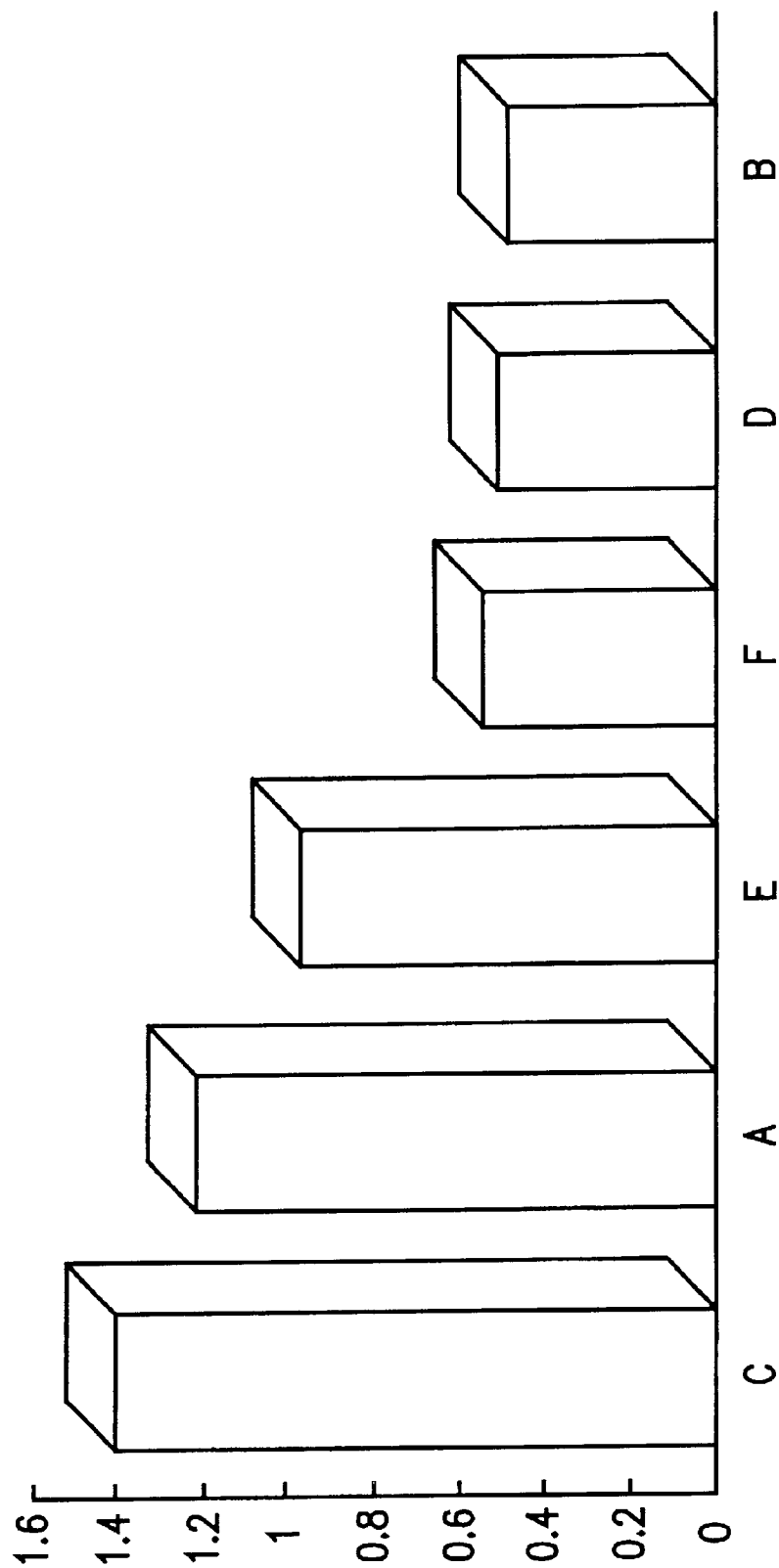
FIG. 1 shows graphically the decrease in weight of inventive and known chewing gums during a storage test.

Preparation of a chewing gum strip containing a sweetener mixture of 1,6-GPS, 1,1-GPS, and 1,1-GPM.

Formula

| | |
|---|---|
| Basic chewing gum compound NOSTIC TWA | 1.50 kg |
| sweetener mixture composed of 1,6-GPS, 1,1-GPS, and 1,1-GPM (37% by weight 1,6-GPS, 2% by weight 1,1-GPS, 54% by weight 1,1-GPM, based on the weight of the sweetener mixture) | 2.50 kg |
| sorbitol syrup (70% dry substance) | 0.60 kg |
| glycerol | 0.15 kg |
| menthol | 0.15 kg |
| flavouring (Spearmint) | 0.10 kg |
| aspartame | 2.5 g |
| acesulfame-K | 2.5 g |

Preparation

The basic chewing gum compound is heated in a heating cabinet at temperatures of 50° C. to 55° C. prior to its transfer into the kneader. Then the basic chewing gum compound is kneaded for 1 to 2 min. During the kneading, the first half of the sweetener mixture is incorporated, after that sorbitol syrup, then the other half of the sweetener mixture, after that, glycerol are added and, finally, the flavouring, menthol and the sweetener. The mixture is kneaded until it has become homogeneous (final temperature approximately 45° C.). The mass is removed from the kneader and subdivided into portions of about 1 kg weight. The subdivided chewing gum mass is placed for intermediate storage for about 15 to 20 min on a substrate sprinkled with talcum, is extruded with an appropriate extruder, and processsed further in the conventional manner.

The almost complete replacement of the readily soluble sugar alcohol sorbitol and the complete replacement of the likewise readily soluble maltitol cause a so-called "long lasting" effect due to the reduced (in comparison with sugar) solubility of the sugar alcohols 1,6-GPS, 1,1-GPS, and 1,1-GPM (flavour enhancement). Because of its sugar-free composition, the product is suitable also for diabetics.

Example 2

Preparation of a chewing gum pad containing a sweetener mixture of 1,6-GPS, 1,1-GPS, and 1,1-GPM.

Formula

| | |
|---|---|
| Basic chewing gum compound NOSTIC TWA | 1.20 kg |
| sweetener mixture composed of 1,6-GPS, 1,1-GPS, and 1,1-GPM (37% by weight 1,6-GPS, 2% by weight 1,1-GPS, 54% by weight 1,1-GPM, based on the weight of the sweetener mixture) | 3.00 kg |
| glycerol | 0.60 kg |
| saccharin | 2.50 g |
| flavouring (peppermint) | 0.10 kg |

Preparation

The preparation was carried out in analogy to Example 1. There is obtained a sugar-free chewing gum suitable for diabetics and having increased storability and advantageous solubility features.

The replacement of sorbitol and sorbitol syrup or maltitol syrup in conventional formulas results in a so-called "long lasting" effect (flavour enhancement) due to the comparatively (in comparison with sugar) reduced solubility of the sugar alcohols 1,6-GPS, 1,1-GPS, and 1,1-GPM.

Example 3

Storage Test With Chewing Gums

In a 14-day storage test at 20° C. and 40% relative humidity, the chewing gums were studied in regard to water loss manifesting itself by a decrease in weight. The inventive chewing gums were prepared with the formula of Example 1 (B) and with the formula of Example 2 (D). Chewing gums of conventional composition were prepared for comparison. Chewing gums which contained hydrogenated isomaltulose (Isomalt®) (A and C) were prepared in analogy to Example 1 and Example 2 (Example 1: 2.5 kg of equimolar mixture of 1,6-GPS and 1,1-GPM, A; Example 2: 3 kg of equimolar mixture of 1,6-GPS and 1,1-GPM, C). In addition, sugar-containing chewing gums (E and F) were prepared (according to Example 1: 2.5 kg sucrose, E; according to Example 2: 3.3 kg sucrose, 0.3 glycerol, F). Apart from the indicated changes in the formulas, the formulas of Examples 1 and 2 were taken over completely.

The 14-day storage test at 20° C. and 40% relative humidity clearly showed (FIG. 1) that the inventive chewing gums (D, B) have the lowest weight loss and, hence, the lowest moisture loss. Thus, the chewing gums according to the invention have increased flexibility vis-a-vis chewing gums containing Isomalt® or sugar. This means that 1,1-GPS has a plasticising effect and a crystallisation-inhibiting effect on the chewing gums which have a reduced tendency to drying and a structure with increased flexibility. It proves to be an advantage that the chewing gums containing 1,1-GPS have the desired effect irrespective of their specific formula (Example 1, Example 2), i.e., they do not tend to dry out.

Example 4

Sensorial Testing

Sensorial testing of inventive and conventional chewing gums was carried out. The tests were made with 10 tasters testing differences in pairs. Tables 1 and 2 present the results of these tests; the designations A, B, C, D, E, F of Example 4 stand for chewing gums with the compositions of Example 3.

TABLE 1

Chewing features at the beginning of chewing

| Designation of sample | hardness | flavour intensity | sweetness intensity | overall sensation |
|---|---|---|---|---|
| A | 2.7 | 4.8 | −2.7 | 2.4 |
| B | 2.4 | 3.0 | −1.8 | 3.4 |
| C | 1.3 | 2.5 | −2.2 | 2.7 |
| D | 2.8 | 2.3 | 1.0 | 3.8 |
| E | 5.7 | 3.5 | 2.2 | 3.2 |
| F | 5.5 | 4.7 | 3.1 | 2.7 |

TABLE 2

Chewing features after 5 minutes

| Designation of sample | elasticity | hardness | flavour intensity | sweetness intensity | overall sensation |
|---|---|---|---|---|---|
| A | 3.8 | 4.5 | 3.7 | 4.2 | 2.4 |
| B | 4.0 | 4.3 | 3.2 | −2.7 | 3.4 |
| C | 3.5 | 4.5 | 2.7 | −2.8 | 2.7 |
| D | 4.3 | 3.5 | 2.8 | −3.0 | 3.8 |
| E | 4.8 | 4.8 | 4.0 | −1.3 | 3.2 |
| F | 4.7 | 4.8 | 3.3 | 1.5 | 2.7 |

The meaning of the numerical assessment is shown below:

elasticity: 1(inelastic)—6 (elastic)

hardness: 1 (hard)—6 (soft)

flavour intensity: 1 (low)—6 (high)

sweetness intensity: 6 (too sweet)—1 (optimal) —6 (not sweet enough)

overall sensation: 1 (poor)—6 (good)

It turned out that the inventive 1,1-GPS-containing formulas B and D left the best overall sensation at the beginning of chewing; this is to be put down to the sweetness intensity, inter alia.

Also in the chewing features after 5 minutes it turned out that the overall sensation provided by the inventive formulas B and D are, in comparison, the best.

What is claimed is:

1. Chewing gum containing 1,1-GPS (1-O-α-D-glucopyranosy-D-sorbitol).

2. Chewing gum containing a sweetener mixture composed of 1,6-GPS (6-O-α-D-glucopyranosyl-D-sorbitol), 1,1-GPS (1-O-α-D-glucopyranosyl-D-sorbitol), and 1,1-GPM (1-O-α-D-glucopyranosyl-D-mannitol).

3. The chewing gum according to claim 2, wherein the sweetener mixture contains 10 to 50% by weight of 1,6-GPS, 2 to 20% by weight of 1,1-GPS, and 30 to 70% by weight of 1,1-GPM, based on the weight of the sweetener mixture.

4. The chewing gum according to claim 2, wherein the sweetener mixture which contains 5 to 10% by weight of 1,6-GPS, 30 to 40% by weight of 1,1-GPS, and 45 to 60% by weight of 1,1-GPM, based on the weight of the sweetener mixture.

5. The chewing gum according to claim 2 containing said sweetener mixture in an amount of 10 to 75% by weight, an intense sweetener in an amount of 0 to 3% by weight, a flavouring in an amount of 0 to 3% by weight, a basic chewing gum compound in an amount of 10 to 75% by weight, a sugar alcohol in an amount of 0 to 65% by weight, glycerol in an amount of 0 to 15% by weight, and a pharmaceutically active ingredient in an amount of 0 to 3% by weight, based on the total weight of the chewing gum.

6. The chewing gum according to claim 1, containing, in addition, a sugar alcohol, inulin or mixtures thereof.

7. The chewing gum according to claim 6 in which the sugar alcohol is selected from the group consisting of mannitol, sorbitol, xylitol, polydextrose and mixtures thereof.

8. The chewing gum according to claim 1, containing, in addition, a pharmaceutically active ingredient.

9. The chewing gum according to claim 8 in which the active ingredient is selected from the group consisting of nicotine, caffeine, an antibiotic, a fluoride, a vitamin, a coenzyme, a mineral and a fungicide.

10. The chewing gum according to claim 1, containing, in addition, an intense sweetener.

11. The chewing gum according to claim 10 in which the intense sweetener is selected from the group consisting of acesulfame-K, saccharin, cyclamate, Alitame, sucralose and aspartame.

12. The chewing gum according to claim 10 in which the GPS of the sweetener mixture is contained in an amount of 30 to 60% by weight based on the total weight of the chewing gum.

13. The chewing gum according to claim 1, in which 1,1-GPS is contained in an amount of 10 to 75% by weight based on the total weight of the chewing gum.

14. The chewing gum according to claim 1, the surface of which is coated with a member selected from the group consisting of sorbitol, maltitol, xylitol, an almost equimolar mixture of 1,6-GPS and 1,1-GPM and a sweetener mixture containing 1,6-GPS, 1,6-GPS, and 1,1-GPM.

15. A method of improving the texture, the release of flavorings or the release of active ingredients of a sugar-free chewing gum which comprises incorporating therein 1,1-GPS (1-O-alpha-D-glucopyranosyl-D-sorbitol) or a sweetener mixture composed of 1,6-GPS (6-O-alpha-D-glucopyranosyl-D-sorbitol), 1,1-GPS and 1,1-GPM (1-O-alpha-D-glucopyranosyl-D-mannitol).

16. The method according to claim 15 in which the amount of GPS or the sweetener mixture is 10 to 75% by weight based on the total weight of the chewing gum.

17. The method of claim 16 in which the sweetener mixture contains 10 to 50% by weight of 1,6-GPS, 2 to 20% by weight of 1,1-GPS and 30 to 70% by weight of 1,1-GPM, based on the weight of the sweetener mixture.

18. The method of claim 16 in which the sweetener mixture contains 5 to 10% by weight of 1,6-GPS, 30 to 40% by weight of 1,1-GPS and 45 to 60% by weight of 1,1-GPM, based on the weight of the sweetener mixture.

* * * * *